(12) United States Patent
Noh et al.

(10) Patent No.: US 9,515,331 B2
(45) Date of Patent: Dec. 6, 2016

(54) FUEL CELL

(71) Applicant: Hyundai Motor Company, Seoul (KR)

(72) Inventors: Yong Gyu Noh, Gyeonggi-do (KR); Dong Jo Oh, Gyeonggi-do (KR); Bu Kil Kwon, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 409 days.

(21) Appl. No.: 14/064,493

(22) Filed: Oct. 28, 2013

(65) Prior Publication Data

US 2014/0377673 A1 Dec. 25, 2014

(30) Foreign Application Priority Data

Jun. 21, 2013 (KR) ........................ 10-2013-0071400

(51) Int. Cl.
*H01M 8/04* (2016.01)
*H01M 8/24* (2016.01)

(52) U.S. Cl.
CPC ....... *H01M 8/04089* (2013.01); *H01M 8/2485* (2013.01); *H01M 8/04126* (2013.01); *Y02E 60/50* (2013.01)

(58) Field of Classification Search
CPC ..................... H01M 8/04089; H01M 8/04126; H01M 8/2485; Y02E 60/50
See application file for complete search history.

(56) References Cited

U.S. PATENT DOCUMENTS

| | | | | |
|---|---|---|---|---|
| 2008/0199746 A1* | 8/2008 | Kobayashi | ........ | H01M 8/04089 429/430 |
| 2009/0130510 A1* | 5/2009 | Ishikawa | ........... | H01M 8/04089 429/411 |
| 2009/0220831 A1* | 9/2009 | Reoser | ............. | H01M 8/04201 429/415 |
| 2011/0223513 A1* | 9/2011 | Miller | ............... | H01M 8/04201 429/458 |
| 2011/0229799 A1* | 9/2011 | Bogumil | .......... | H01M 8/04089 429/513 |

FOREIGN PATENT DOCUMENTS

| | | | |
|---|---|---|---|
| JP | H07326378 | A | 12/1995 |
| JP | H11-185785 | A | 7/1999 |
| JP | 2000-067901 | A | 3/2000 |
| JP | 2009087587 | A * | 4/2009 |
| JP | 2011-090912 | A | 5/2011 |
| KR | 10-2003-0041242 | | 5/2003 |
| KR | 10-2006-0020929 | A | 3/2006 |
| KR | 10-2009-0049932 | A | 5/2009 |
| KR | 10-2011-0083413 | A | 7/2011 |

OTHER PUBLICATIONS

Machine translation of Japanese Patent Document JP 2009087587 A, published Apr. 23, 2009.*

* cited by examiner

*Primary Examiner* — Carlos Barcena
*Assistant Examiner* — Lilia V Nedialkova
(74) *Attorney, Agent, or Firm* — Mintz Levin Cohn Ferris Glovsky and Popeo, P.C.; Peter F. Corless (57) ABSTRACT

A fuel cell including a stack in which a plurality of cells are stacked includes an air manifold and a hydrogen manifold on a first side and a second side of the stack, respectively, a jet array including a tubular body inserted in the air manifold or the hydrogen manifold and a plurality of orifices formed in the tubular body and arranged in a longitudinal direction of the tubular body, a pump or a valve for supplying air or hydrogen to the jet array; and a controller that operates the pump or the valve.

9 Claims, 7 Drawing Sheets

FUEL CELL

CROSS REFERENCE TO RELATED APPLICATION

This application claims under 35 U.S.C. §119(a) the benefit of Korean Patent Application No. 10-2013-0071400 filed on Jun. 21, 2013, the entire contents of which are incorporated herein by reference.

BACKGROUND OF THE INVENTION

Field of the Invention

The present invention relates, in general, to a fuel cell that enables uniform air, hydrogen, and cooling water distributions over a stack channel, suppresses flooding, and manages faulty cells.

Description of the Related Art

Improvement of the performance of a fuel cell at a high current requires a smooth supply of air. Currently, in fuel cell systems, air supply is achieved through a high voltage air compressor. In this case, when rotational speed (revolutions per minute (RPM)) of the compressor is increased for the purpose of increasing a flow rate of air for high output power, power consumption spikes and an overall efficiency of a fuel cell system decreases.

Furthermore, since the output power of a fuel cell depends on the flow rate of air, maximum output power of a fuel cell is limited by the limited flow rate of air. Accordingly, there is an increasing demand for a technology which can improve efficiency of a fuel cell while reducing concentration loss in a high output power region by increasing the flow rate of air and by maintaining constant rotational speed of the air compressor.

In general, a fuel cell generates electricity through electrochemical reaction between oxygen from air and hydrogen as fuel, producing water as a byproduct. The water produced at an electrode advantageously serves to adjust RH (Relative Humidity) of a membrane but also negatively functions for transmission of air into a gas distribution layer (GDL) or the electrode, by blocking the pores in the gas distribution layer or the electrode. The water produced is often not appropriately removed and as such a surplus exists at the electrode and within a channel (or the GDL). This phenomenon is called flooding Flooding impedes transfer of air and hydrogen, leading to a dramatic plunge in the performance of specific cells in a low output power region. Flooding is a main factor of the overall performance of a fuel cell and its associated limitations. When the flooding occurs, a driver experiences performance decline of a vehicle or feels hesitation even in a low power state.

For a fuel cell vehicle, when the flooding occurs, the water is removed by promptly increasing the flow rate of air. However, the increased flow rate is likely to result in an increase in power consumption, wearing down of the membrane, and deterioration in the durability of the membrane which is attributable to drying of the membrane. Accordingly, preferably, the occurrence of flooding should be prevented in advance. One of key factors of flooding is non-uniform air supply rather than insufficiency of supplied air. Accordingly, it is necessary to maintain a constant flow rate of air during air supply in order to prevent local flooding.

The present invention serves to eliminate disadvantageous conditions for uniform air supply through the use of equipment and devices suitable for a manifold, and to improve performance and stability of a system through active controls.

The foregoing is intended merely to aid in the understanding of the background of the present invention, and is not intended to mean that the present invention falls within the purview of the related art that is already known to those skilled in the art.

SUMMARY OF THE INVENTION

Accordingly, the present invention has been made keeping in mind the above problems occurring in the related art, and the present invention is intended to propose a fuel cell that can achieve uniform air, hydrogen, and cooling water distributions over a channel of a stack.

In order to achieve the above object, according to one aspect of the present invention, there is provided a fuel cell including a stack in which a plurality of cells are stacked, an air manifold and a hydrogen manifold provided at a first side and a second side of the stack, respectively, a jet array including a tubular body inserted in the air manifold or the hydrogen manifold and a plurality of orifices formed in the tubular body and arranged in a longitudinal direction of the tubular body, a pump or a valve for supplying air or hydrogen to the jet array, and a controller that operates the pump or the valve.

According to another aspect of the present invention, there is provided a fuel cell including a stack in which a plurality of cells are stacked, an air introduction manifold and an air discharge manifold provided at a first side and a second side of the stack, respectively, a jet array including a tubular body inserted in the air introduction manifold and a plurality of orifices formed in the tubular body and arranged in a longitudinal direction of the tubular body, a humidifier and an air compressor connected to the air introduction manifold, a jet stream-generating compressor connected to the jet array, and a controller which operates the jet stream-generating compressor.

In particular, the jet stream-generating compressor may be connected to a front stage of the air compressor and/or to a position between the air compressor and the humidifier or between the humidifier and the air introduction manifold.

The air discharge manifold may be connected to the humidifier, and the jet stream-generating compressor may be connected to a position between the air discharge manifold and the humidifier. As such, in some embodiments, the jet stream-generating compressor may be connected to a discharge side of the humidifier. Additionally, the jet stream-generating compressor may be connected to the jet array via a jet valve. Furthermore, the directions from which the air is supplied to the air introduction manifold and the jet array may be opposite to each other. Also, the controller may cause the jet stream-generating compressor to start operating when the fuel cell stops operating.

According to a further aspect of the present invention, there is provided a fuel cell including a stack in which a plurality of cells are stacked, a hydrogen introduction manifold and a hydrogen discharge manifold provided at a first side and a second side of the stack, respectively, a jet array including a tubular body inserted in the hydrogen introduction manifold and a plurality of orifices formed in the tubular body and arranged in a longitudinal direction of the tubular body, an ejector and a hydrogen valve connected to the hydrogen introduction manifold, a jet valve connected to the jet array, and a controller that controls the jet valve.

A first end of the jet valve may be connected to the jet array and a second end of the jet valve may be connected to a position between the ejector and the hydrogen valve and/or a front stage of the hydrogen valve.

The directions from which the hydrogen is supplied to the hydrogen introduction manifold and the jet array may be opposite to each other. The controller may open the jet valve when the fuel cell stops operating. The controller may periodically open the jet valve after the fuel cell stops operating.

According to a yet further aspect of the present invention, there is provided a fuel cell including a stack in which a plurality of cells are stacked, a hydrogen introduction manifold and a hydrogen discharge manifold provided at a first side and a second side of the stack, respectively, a jet array including a tubular body inserted in the hydrogen introduction manifold and a plurality of orifices formed in the tubular body and arranged in a longitudinal direction of the tubular body, an ejector that takes in hydrogen from the hydrogen discharge manifold and returns the hydrogen to the hydrogen introduction manifold, a jet valve having a first end connected to the jet array and a second end connected to a hydrogen tank, and a controller that controls the jet valve.

According to a yet further embodiment of the present invention, there is provided a fuel cell including a stack in which a plurality of cells are stacked, an air introduction manifold provided at a first side of the stack, a jet array including a tubular body inserted in the air introduction manifold and a plurality of orifices formed in the tubular body and arranged in a longitudinal direction of the tubular body, a humidifier and an air compressor connected to the air introduction manifold, a jet valve having a first end connected to the jet array and a second end connected to a hydrogen supply pipe, and a controller that controls the jet valve. The controller may open the jet valve when the fuel cell starts operating.

According to a fuel cell having a construction described above, uniform air, hydrogen, and cooling water distributions can be achieved over a channel of a stack, flooding can be suppressed, and faulty cells can be managed. More specifically, selective management of the faulty cells ensures sufficient overall output power of a fuel cell. In addition, suppression of the flooding at a cathode (e.g., an air electrode) or an anode (e.g., a hydrogen electrode) prevents deterioration of durability of a fuel cell, prevents oxidation of a carbon support, and contributes to a uniform flow of cooling water. As such, the fuel cell according to the present invention can be used for cold startup and long-term parking of a vehicle without deterioration in its durability.

BRIEF DESCRIPTION OF THE DRAWINGS

The above and other objects, features and advantages of the present invention will be more clearly understood from the following detailed description when taken in conjunction with the accompanying drawings, in which.

DETAILED DESCRIPTION OF THE INVENTION

Hereinbelow, preferred embodiments of the present invention will be described in detail with reference to the accompanying drawings.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid fuel cell vehicles, electric fuel cell vehicles, combustion, plug-in hybrid electric fuel cell vehicles, hydrogen-powered vehicles, and other alternative fuel cell vehicles (e.g. fuels derived from resources other than petroleum).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Figure 1:
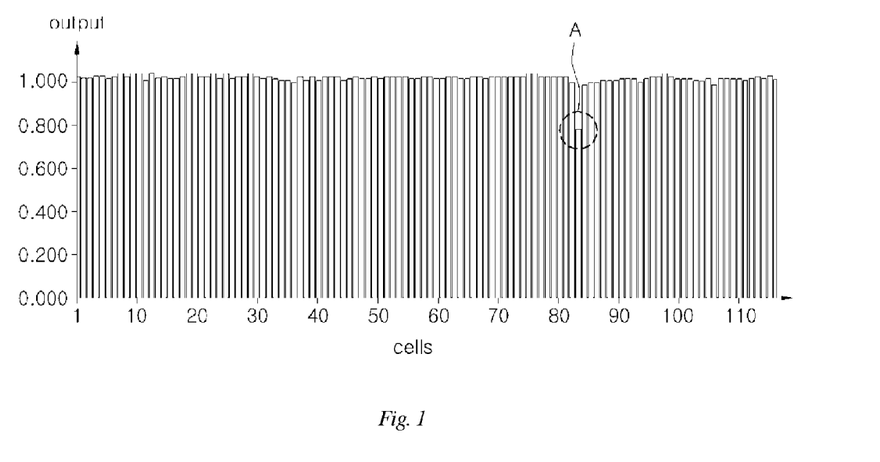
FIG. 1 is a graph illustrating an output state of a faulty cell.

FIG. 1 is a graph illustrating an output state of a faulty cell. In a fuel cell, water produced at an electrode advantageously serves to adjust RH of a membrane but negatively functions to block the pores in the electrode or a gas diffusion layer (GDL), preventing transfer of air to the electrode by the above blocking operation. More specifically, the water produced is often not removed appropriately and an excessive amount of water is likely to exist at the electrode, a channel, or the GDL. This state is called flooding. When the flooding occurs, transfer of air and hydrogen gas is impeded and the performance of specific cells dramatically declines in a low output power region, limiting the overall performance of the fuel cell.

Accordingly, when employing the fuel cell in a vehicle, many fuel cells are connected in series to each other and stacked in a body to form a fuel cell stack and this fuel cell stack is mounted in the vehicle in order to generate a large amount of electric power. Since the fuel cells are connected in series, if only one fuel cell exhibits low performance, this fuel cell acts as a bottleneck and thus the overall performance of the fuel cell stack is limited. That is, when the flooding occurs, a driver experiences a performance decline of a vehicle or feels hesitation even in a low power state.

When the flooding occurs in an ordinary fuel cell vehicle, the water is removed by promptly increasing a flow rate of air. However, the increased flow rate of air is likely to result in an increase in power consumption, wearing of a membrane, and deterioration in the durability of a membrane which is attributable to drying of the membrane. Accordingly, preferably, occurrence of the flooding should be prevented in advance. One of key factors of the flooding is non-uniform air supply rather than insufficiency of supplied air. Accordingly, it is necessary to maintain a constant flow rate of air during the air supply in order to prevent local flooding. When the local flooding occurs, the output power of part of fuel cells A dramatically declines as seen from the graph of FIG. 1.

Figure 2:
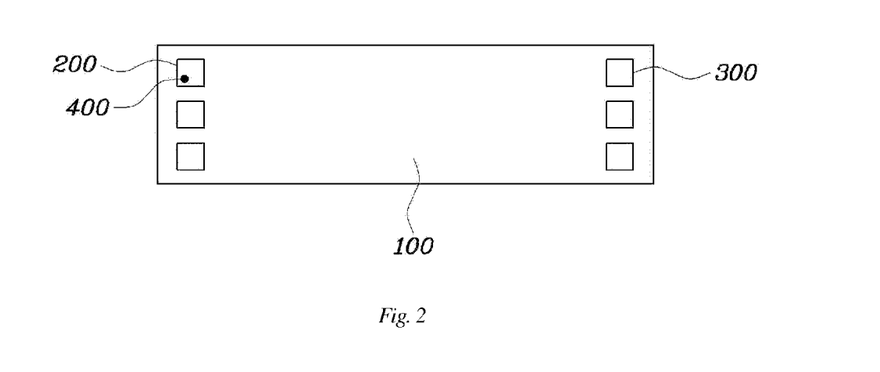
FIG. 2 is a diagram illustrating a fuel cell according to a first exemplary embodiment of the present invention.
Figure 3:
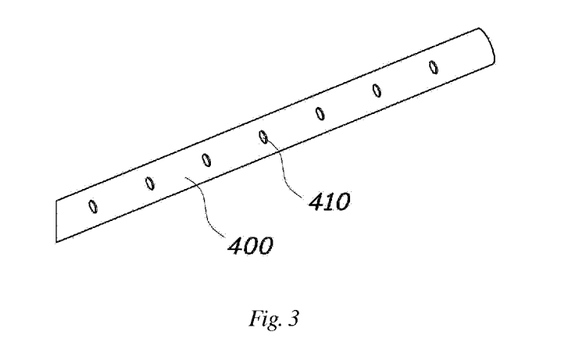
FIG. 3 is a diagram illustrating a jet array of the fuel cell according to the first exemplary embodiment of the present invention.
Figure 4:
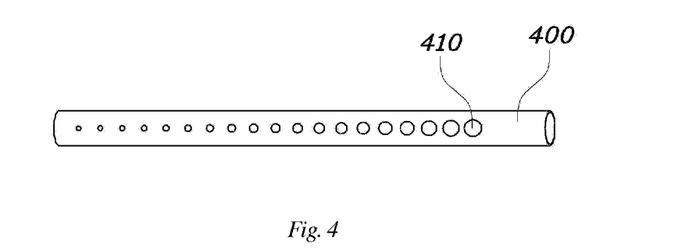
FIGS. 4 and 5 are diagrams illustrating different types of jet arrays of the fuel cell according to exemplary embodiments of the present invention.
Figure 5:
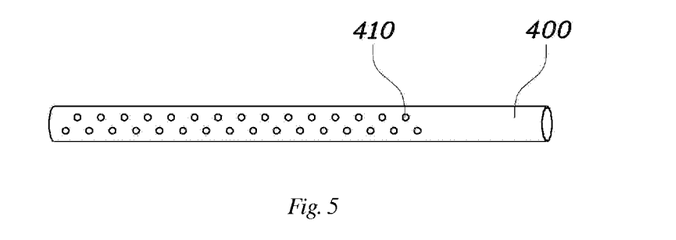
Figure 6:
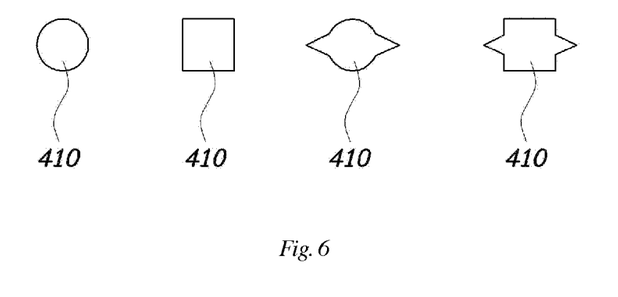
FIG. 6 is a diagram illustrating an orifice of the jet array of the fuel cell according to the first exemplary embodiment.

FIG. 2 is a diagram illustrating a fuel cell according to a first exemplary embodiment of the present invention, FIG. 3 is diagram illustrating a jet array of the fuel cell according to the first exemplary embodiment of the present invention, FIGS. 4 and 5 are diagrams illustrating different types of jet arrays of the fuel cell according the first exemplary embodiment of the present invention, FIG. 6 is a diagram illustrating an orifice of the jet array of the fuel cell according to the first exemplary embodiment, and FIGS. 7 to 14 are diagrams illustrating fuel cells according to second to ninth exemplary embodiments of the present invention.

The fuel cell according to the first exemplary embodiment of the present invention includes a stack of fuel cells in which a plurality of cells are stacked, an air manifold 200 provided to a first side of the stack, a hydrogen manifold 300 provided to a second side of the stack, a jet array 400, which includes a tubular body inserted in the air manifold 200 or the hydrogen manifold 300 and a plurality of orifices 410 formed in the tubular body and arranged in a longitudinal direction of the tubular body, a pump 440 or a valve 420 for supplying air or hydrogen to the jet array 400, and a controller that operates the pump 440 or the valve 420.

In the fuel cell, a plurality of plate-like cells are typically stacked to form one module. Each cell has manifold holes/apertures, which are through holes for introduction and discharge of air, hydrogen gas, and cooling water. When the cells are stacked, manifolds for introduction and discharge of air, hydrogen gas, and cooling water are constructed. A channel is formed in the stacked cells and the channel extends through an end plate 100. In this way, introduction manifolds and discharge manifolds for air, hydrogen gas, and cooling water are formed.

The air manifold 200 and the hydrogen manifold 300 are formed at a first side and a second side of the stack, respectively. The jet array 400 may be inserted in the air manifold 200 and/or alternatively the hydrogen manifold 300. The jet array 400 includes the tubular body and the plurality of orifices 410 each continuously extending in the longitudinal direction of the tubular body. The pump 440 or the valve 420 is provided to supply air or hydrogen gas to the jet array 400. The controller 500 operates the pump or the valve, which enables additional supply of air or hydrogen gas in addition to the supply of air or hydrogen gas through the manifolds in an automated manner.

The jet array 400 is constructed by puncturing a tube, forming the plurality of orifices 410 so that the jet array 400 can intensively discharge the fluid to each cell from the plurality of orifices 410. That is, a jet stream of the fluid forms so that the fluid can be discharged at a higher speed than those fuel cells of the conventional art. In association with the orifices 410, a jet stream generator may be further provided to form a stronger jet stream. The tubular body is made from an insulating material such as a polymer, ceramics, etc. in order to prevent conduction between the respective tubular bodies.

The jet array 400 may be shaped as illustrated in FIG. 3, and the orifices 410 may be arranged as illustrated in FIGS. 4 and 5. That is, the orifices 410 may gradually decrease in size, or identical orifices 410 may be arranged in a zigzag pattern. The orifices 410 may have various shapes as shown in FIG. 6 that can cause a turbulent flow. Examples of the shape include a circle, a rectangle, a circle with notch portions, and a rectangle with notch portions.

Figure 7:
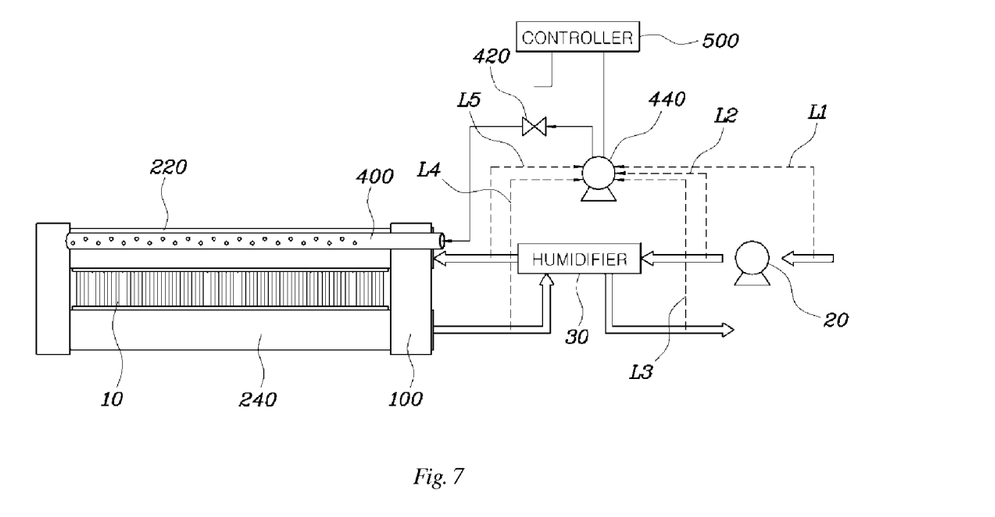
FIGS. 7 to 14 are diagrams illustrating various fuel cells according to second to ninth exemplary embodiments of the present invention.

FIG. 7 is a diagram illustrating a fuel cell according to the second embodiment. The fuel cell according to the second embodiment includes an air introduction manifold 220 formed at a first side of a stack, an air discharge manifold 240 formed at a second side of the stack, a jet array 400 which includes a tubular body inserted in the air introduction manifold 220 and a plurality of orifices 410 formed in the tubular body and arranged in a longitudinal direction of the tubular body, a humidifier 30 and an air compressor 20 which are connected to the air introduction manifold 220, a jet stream-generating compressor 440 connected to the jet array 400, and a controller 500 which operates the jet stream-generating compressor 440.

The jet array in this embodiment may be installed in the air introduction side. That is, the jet array may be inserted in the air introduction manifold. Aside from this, the humidifier and the air compressor may be connected to the air introduction manifold to form a primary air supply system. The jet array as a result is connected to the jet stream-generating compressor, and the controller operates the jet stream-generating compressor.

The jet stream-generating compressor may be connected to a front end of the air compressor as indicated by a dotted line L1, to a position between the air compressor and the humidifier as indicated by a dotted line L2, or to a position between the humidifier and the air introduction manifold as indicated by a dotted line L5. Alternatively, the air discharge manifold may be connected to the humidifier, and the jet stream-generating compressor may be connected to a position between the air discharge manifold and the humidifier as indicated by a dotted line L4. Further alternatively, the jet stream-generating compressor may be connected to an exit side of the humidifier as indicated by a dotted line L3.

As a still further alternative, the jet stream-generating compressor may be connected to the jet array via a jet valve. In this case, air is introduced through the jet stream-generating compressor, and air is injected into the jet array in a pulse pattern which is achieved by switching of the jet valve. In this way, a jet stream of air is discharged to each cell from the orifices in the pulse pattern.

That is, according to some embodiments, the jet array 400 is positioned at the air introduction manifold 220 of the stack, and the air supply is controlled through the jet stream-generating compressor 440. Since the jet array includes a plurality of orifices formed in the outer surface of the tubular body, air can be supplied to each cell as a jet stream when the air is supplied. A suction hole of the jet stream-generating compressor takes in air from the atmosphere, around an introduction hole of the air compressor, a discharge hole of the stack, or a discharge hole of the humidifier.

Figure 8:
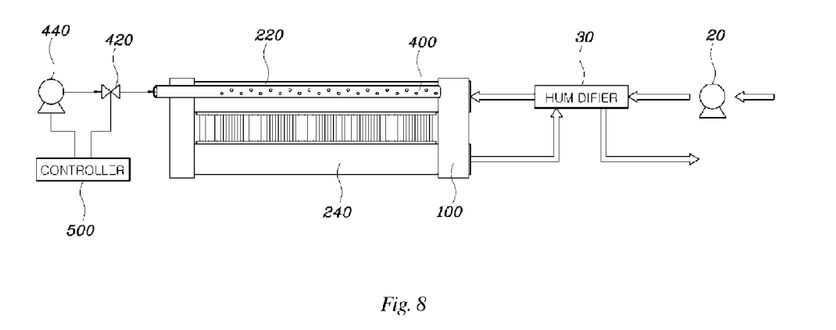

The air distributions can be controlled by adjusting the size of each orifice according to the frequency of cell omissions and driving conditions. The direction of air supplied to the jet array can also be changed. That is, as shown in FIG. 8, the directions of air supplied to the air introduction manifold 220 and the jet array 400 are opposite to each other.

A typical measure which is taken when the amount of air supplied to each cell is insufficient is to increase operational speed of the air compressor to increase the flow rate of the air. However, in the exemplary embodiment, when the amount of air is insufficient, the jet stream-generating compressor starts to operate, spraying a high-speed jet stream of air to each cell through the jet array. The jet valve may be used as necessary to supply air in a pulse pattern, which generates a jet stream of higher speed, achieving more effective air supply.

The controller may be configured to control the jet stream-generating compressor to operate when the fuel cell stops operating. Start-up of an engine under the condition of a low ambient temperature (e.g., below 0° C.) causes many problems in the fuel cell. Starting time, starting characteristics, and durability of the stack vary depending on a state inside the stack Vapor and water remaining after the start-up have a critical impact on cold start-up conditions. That is, the smaller the amount of water (ice), the better the characteristics of the cold start-up and BOP components for the cold start-up.

According to the exemplary embodiment of the present invention, the logic of supplying moisture-free air and hydrogen through the jet array in the pulse pattern is applied to a shut-down sequence. In the shut-down process of the fuel cell system, the pulsed flow of air is generated through increase and decrease in operational speed of the jet stream-generating compressor or switching of the jet valve installed at the discharge side of the jet stream-generating compressor, and a strong jet stream of low temperature air is sent to each cell of the stack, discharging moisture and water remaining at the cathode of the stack Switching timing of the jet valve may be determined using the temperature at the discharge side of the stack.

Figure 9:
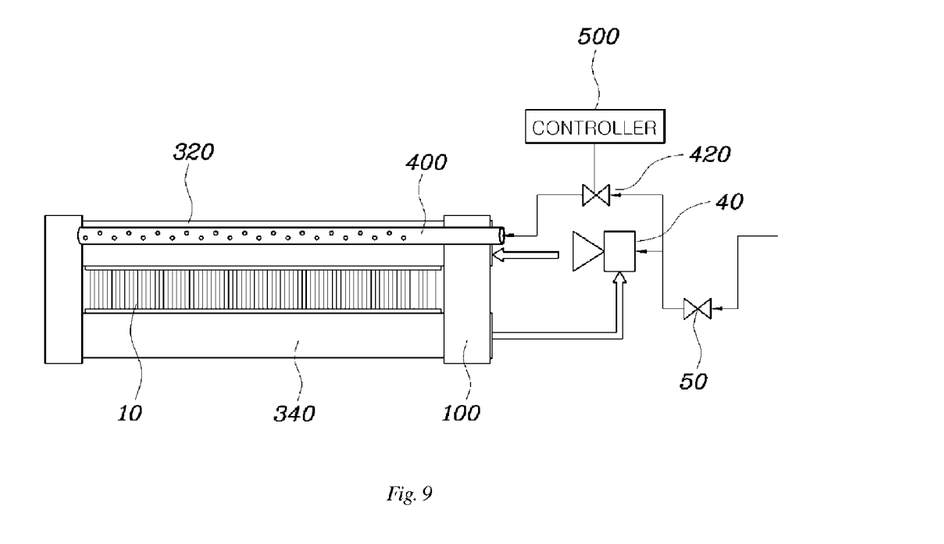
Figure 10:
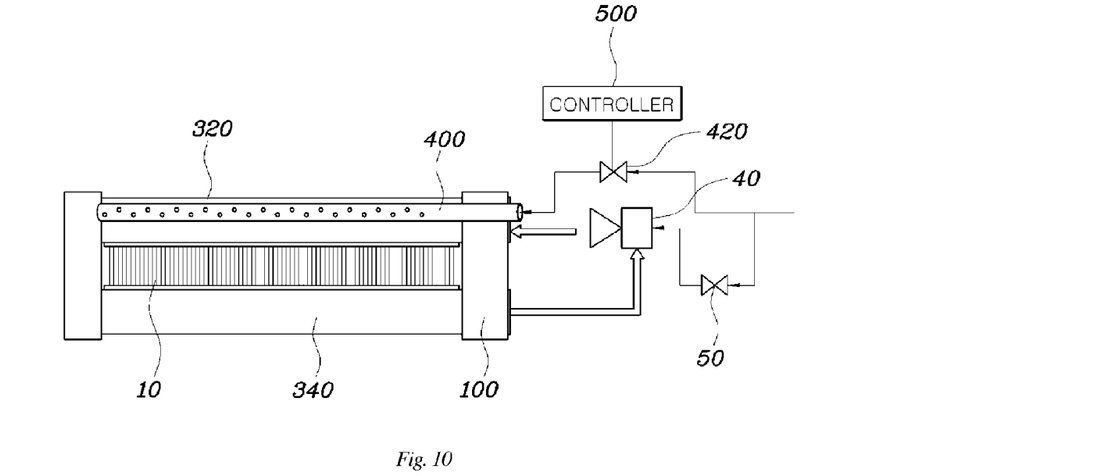
Figure 11:
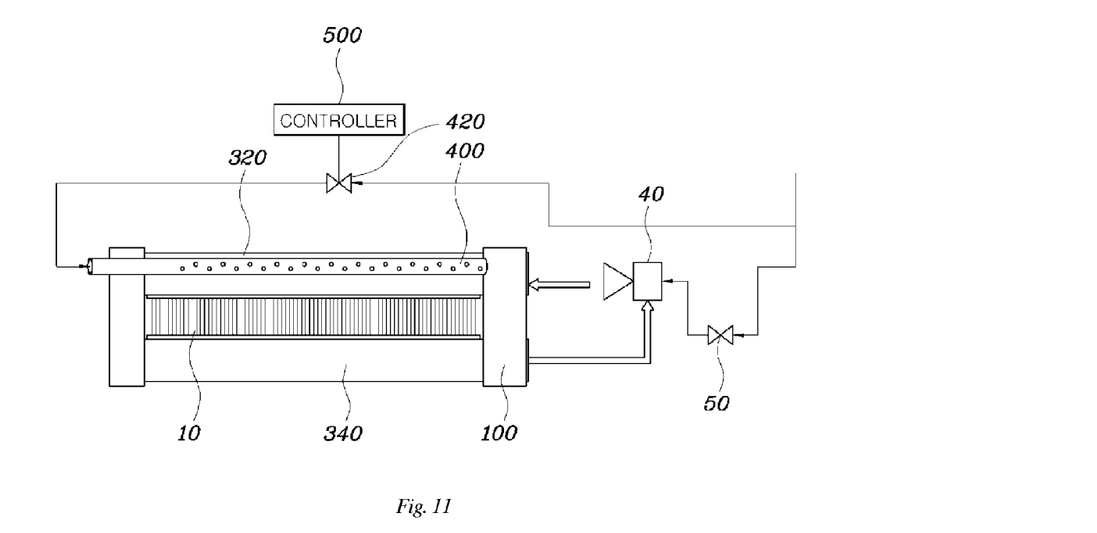

A fuel cell according to another exemplary embodiment includes a plurality of cells stacked on one another, forming a stack, a hydrogen introduction manifold 320 formed at a first side of the stack, a hydrogen discharge manifold 340 formed at a second side of the stack, a jet array 400 including a tubular body inserted in the hydrogen introduction manifold 320 and a plurality of orifices 410 formed in the tubular body and arranged in a longitudinal direction of the tubular body, an ejector 40 and a hydrogen valve 50 connected to the hydrogen introduction manifold 320, a jet valve 420 connected to the jet array 400, and a controller which controls the jet valve 420.

In this case, as illustrated in FIGS. 9 to 11, the jet array 400 is installed in the hydrogen introduction manifold 320. Since a hydrogen fuel supply system receives compressed hydrogen gas from a tank, a compressor for supplying the hydrogen is not necessary unlike the air supply system. Meanwhile, the hydrogen supply system needs include a hydrogen valve for controlling flow of hydrogen of high pressure and the jet array.

As illustrated in FIG. 9, an end (first end) of the jet valve 420 is connected to the jet array 400, and the other end (second end) is connected to a midway position between the ejector 40 and the hydrogen valve 50. Alternatively, as illustrated in FIG. 10, the first end of the jet valve 420 may be connected to the jet array 400 and the second end of the jet array 420 may be connected to a front stage of the hydrogen valve 50. Further alternatively, as illustrated in FIG. 11, the directions of the flow of hydrogen supplied to the hydrogen introduction manifold 320 and the jet array 400 may be opposite to each other.

For current fuel cell vehicles, air externally supplied is introduced into a cathode of a stack at a predetermined time after stopping operation of a fuel cell, and then transferred to an anode (fuel electrode) through a membrane. When the fuel cell is operated in a state in which oxygen exists at the fuel cell, a high voltage is locally generated, oxidizing a graphite support. This is one of major factors contributing to deterioration in the performance of the fuel cell. Accordingly, in order to improve durability of the fuel cell vehicle, it is necessary to delay supply of air to the stack when the fuel cell vehicle is parked for a long period.

To this end, when the fuel cell vehicle is parked for a long period of time, a trace amount of hydrogen is supplied to the anode through the jet array, which delays introduction of air to the cathode. This method removes air based on Cathode Oxygen Depletion (COD) which causes oxygen contained in the air existing at the cathode to react with hydrogen existing at the anode. In this case, the amount of hydrogen supplied is determined depending on the volume of the stack channel, the volume of the manifold, the volume of a recirculation loop, etc.

Incidentally, since there is a regulation that prohibits opening of a high pressure tank in a fuel cell vehicle that is parked, only hydrogen existing in a main pipe between a high pressure tank valve and the stack can be used during the period of time in which the fuel cell vehicle is parked. The amount of this hydrogen is typically 3 to 10 liters. This limits the frequency of hydrogen purging during the long-term parking. Accordingly, it is necessary to reduce the consumption of hydrogen by effectively, efficiently, and uniformly transferring the hydrogen to each cell during the long-term parking. According to the present embodiment, since the hydrogen is directly sprayed to each cell through the jet array, it is possible to effectively delay introduction of air with a relatively small amount of hydrogen compared to conventional technologies, contributing to improvement in durability of the fuel cell vehicle.

Figure 12:
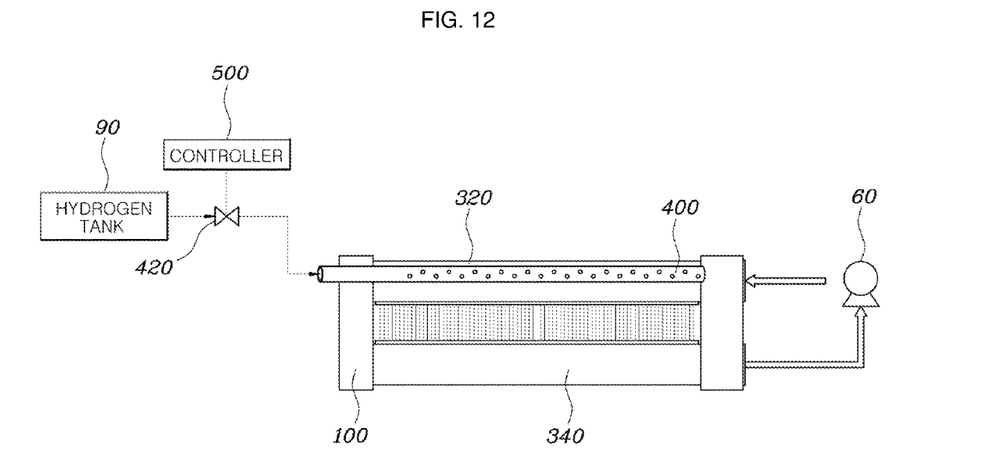
Figure 13:
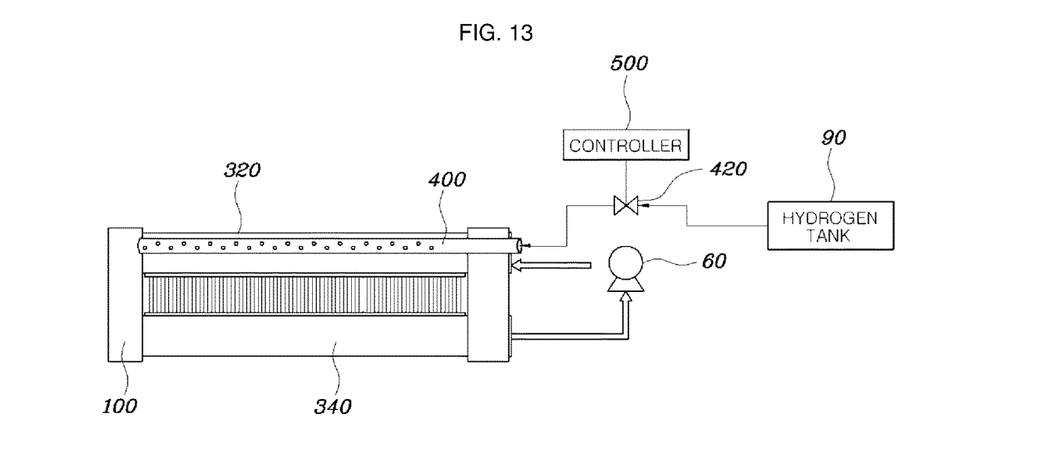

As illustrated in FIGS. 12 and 13, a fuel cell according to a further embodiment of the present invention includes a stack of fuel cells in which a plurality of cells are stacked, a hydrogen introduction manifold 320 provided at a first side of the stack, a hydrogen discharge manifold 340 provided at a second side of the stack, a jet array 400 including a tubular body inserted in the hydrogen introduction manifold 320 and a plurality of orifices 410 formed in the tubular body and arranged in a longitudinal direction, an ejector 40 which takes in hydrogen from the hydrogen discharge manifold 340 and returns the hydrogen to the hydrogen introduction manifold 320, a jet valve 420 with a first end connected to the jet array 400 and a second end connected to a hydrogen tank 90, and a controller 500 which controls the jet valve 420.

In this exemplary embodiment, hydrogen is supplied as new fuel through the jet array 400. The hydrogen supplied through the jet array 400 can be uniformly supplied to each cell. Since the jet array has a sufficiently large area for the hydrogen to receive heat from the surroundings, it is possible to reduce non-uniformity in distribution of fluid.

Figure 14:
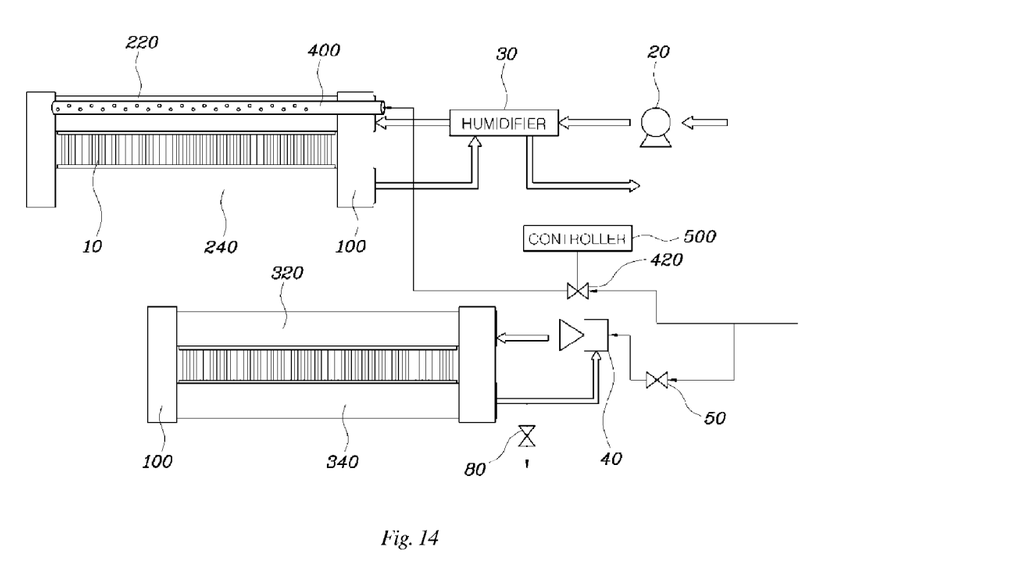

As illustrated in FIG. 14, a fuel cell according to a yet further exemplary embodiment of the present invention includes a stack in which a plurality of cells are stacked, an air introduction manifold 220 provided at a first side of the stack, a jet array 400 including a tubular body inserted in the air introduction manifold 220 and a plurality of orifices 410 formed in the tubular body and arranged in a longitudinal direction, a humidifier 30 and an air compressor 20 connected to the air introduction manifold 220, a jet valve 420 having a first end connected to the jet array 400 and a second end connected to a hydrogen supply pipe, and a controller 500 which controls the jet valve 420. The controller 500 may open the jet valve 420 upon starting operation of the fuel cell.

Another method of preventing a high voltage from being generated during long-term parking of a fuel cell vehicle is to directly spray hydrogen to a cathode. When the fuel cell starts operating, hydrogen is instantaneously sprayed to the cathode through the jet array 400 for air in order to reduce the concentration of oxygen in the cathode, prohibiting a high voltage from being generated. According to this exemplary embodiment, since hydrogen is directly sprayed to each channel of the cathode directly before a primary air compressor starts operating, it is possible to suppress the high voltage from being generated with use of a small amount of hydrogen, contributing to improvement in durability of a membrane.

According to the fuel cell constructed as described above, uniform air, hydrogen gas, and cooling water distributions can be achieved over a channel of a stack, flooding can be suppressed, and faulty cells can be managed. More specifically, selective management of the faulty cells ensures sufficient overall output power of a fuel cell. In addition, suppression of the flooding at a cathode or an anode prevents deterioration in durability of a fuel cell, prevents oxidation of a carbon support, and contributes to a uniform flow of cooling water.

Although a preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A fuel cell comprising:
   a stack in which a plurality of cells are stacked;
   an air introduction manifold and an air discharge manifold provided at a first side and a second side of the stack, respectively;
   a jet array including a tubular body inserted in the air introduction manifold, wherein a plurality of orifices are formed in the tubular body and arranged in a longitudinal direction along the tubular body;
   a humidifier and a first compressor connected to the air introduction manifold;
   a second air compressor connected to the jet array; and
   a controller configured to operate the second air compressor,
   wherein the jet array is arranged in a portion of the air introduction manifold, the first air compressor provides air into a region of the air introduction manifold in which the jet array is not arranged, the second air compressor provides air into the tubular body of the jet array, and the orifices form a jet stream of air.

2. The fuel cell according to claim 1, wherein the second air compressor is connected to a front stage of the first air compressor.

3. The fuel cell according to claim 1, wherein the second air compressor is connected between the first air compressor and the humidifier.

4. The fuel cell according to claim 1, wherein the second air compressor is connected between the humidifier and the air introduction manifold.

5. The fuel cell according to claim 1, wherein the air discharge manifold is connected to the humidifier, and the second air compressor is connected between the air discharge manifold and the humidifier.

6. The fuel cell according to claim 1, wherein the second air compressor is connected to a discharge side of the humidifier.

7. The fuel cell according to claim 1, wherein the second air compressor is connected to the jet array via a jet valve.

8. The fuel cell according to claim 1, wherein directions of air supplied to the air introduction manifold and the jet array are opposite to each other.

9. The fuel cell according to claim 1, wherein the controller causes the second air compressor to start operating when the fuel cell stops operating.

* * * * *